United States Patent
Faucher et al.

(10) Patent No.: US 12,331,147 B2
(45) Date of Patent: Jun. 17, 2025

(54) POLYMER AND ITS PREPARATION METHOD

(71) Applicant: SNF Group, Andrezieux Boutheon (FR)

(72) Inventors: Gatien Faucher, Andrezieux Boutheon (FR); Damien Fougerouse, Andrezieux Boutheon (FR); Bastien Martel, Andrezieux Boutheon (FR); Cyril Barriere, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 0 days.

(21) Appl. No.: 18/873,206

(22) PCT Filed: Jun. 23, 2023

(86) PCT No.: PCT/EP2023/067192
§ 371 (c)(1),
(2) Date: Dec. 9, 2024

(87) PCT Pub. No.: WO2023/247784
PCT Pub. Date: Dec. 28, 2023

(65) Prior Publication Data
US 2025/0171576 A1 May 29, 2025

(30) Foreign Application Priority Data
Jun. 24, 2022 (FR) .................. 2206325

(51) Int. Cl.
*C08F 285/00* (2006.01)
*D21H 17/45* (2006.01)

(52) U.S. Cl.
CPC .......... *C08F 285/00* (2013.01); *D21H 17/45* (2013.01)

(58) Field of Classification Search
CPC ...... D21H 17/45; C08F 212/30; C08F 220/56; C08F 220/54; C08F 220/58
See application file for complete search history.

(56) References Cited

U.S. PATENT DOCUMENTS

| 10,730,989 | B2 | 8/2020 | Horii et al. | |
| 11,629,211 | B2 * | 4/2023 | Hund ............... | D21H 21/18 |
| | | | | 526/307.7 |
| 2004/0118540 | A1 | 6/2004 | Garnier et al. | |
| 2012/0132382 | A1 * | 5/2012 | Hund ............... | D21H 17/41 |
| | | | | 525/369 |
| 2013/0094349 | A1 | 4/2013 | Masayuki et al. | |
| 2020/0140596 | A1 * | 5/2020 | Horii ............... | C08F 267/10 |
| 2020/0325263 | A1 * | 10/2020 | Hund ............... | D21H 21/20 |

FOREIGN PATENT DOCUMENTS

| CN | 109400821 A * | 3/2019 | ......... C04B 24/165 |
| EP | 0377313 A2 | 7/1990 | |
| EP | 0919578 A1 * | 6/1999 | ......... D21H 21/20 |
| JP | 57077398 B2 | 4/2015 | |
| WO | 2006075115 A2 | 7/2006 | |
| WO | 2008107620 A2 | 9/2008 | |
| WO | 2009013423 A2 | 1/2009 | |
| WO | 2010061082 A1 | 6/2010 | |
| WO | 2011015783 A1 | 2/2011 | |
| WO | 2021123599 A1 | 6/2021 | |

OTHER PUBLICATIONS

International Search Report and Written Opinion of the International Searching Authority for PCT/EP2023/067192 mailed on Oct. 12, 2023.

* cited by examiner

*Primary Examiner* — Mark S Kaucher
(74) *Attorney, Agent, or Firm* — Heslin Rothenberg Farley & Mesiti P.C.

(57) ABSTRACT

This invention relates to a new polyvinylamine polymer, its preparation method and use, specifically for application in the field of paper manufacturing.

20 Claims, No Drawings

POLYMER AND ITS PREPARATION METHOD

CROSS REFERENCE TO RELATED APPLICATIONS

This application is a national stage filing under section 371 of International Application No. PCT/EP2023/067192, filed on Jun. 23, 2023, which published on Dec. 28, 2023 as WO 2023/247784, which claims priority to French Application No. 2206325, filed on Jun. 24, 2022. The entire contents of WO 2023/247784 are hereby incorporated herein by reference.

TECHNICAL FIELD OF THE INVENTION

This invention relates to a new polyvinylamine polymer, its preparation method and use, in particular for application in the field of paper manufacturing.

PRIOR ART

The paper industry is in constant search for improvements of its manufacturing processes for paper, cardboard or the like, in particular with regard to costs reduction, yield, productivity and even the end-product properties.

Water-soluble polyamines resulting from the Hofmann degradation are known and widely used in paper manufacturing processes, in particular to improve drainage during the formation of sheets of paper and to improve their dry resistance. These polymers provide better application performances, but they also make it possible to increase the speed of the paper machine and to thus increase productivity.

The Hofmann degradation is a reaction discovered by Hofmann at the end of the nineteenth century, which makes it possible to convert a function (for example, an amide) into a primary amine function with one less carbon atom. The mechanism of the reaction is detailed below.

In the presence of a base (such as soda), a proton is taken away from the amide.

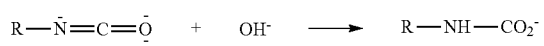

The formed amidate then reacts with the active chlorine ($Cl_2$) of the hypochlorite (e.g.: NaClO which is in equilibrium: $2\ NaOH + Cl_2 \Leftrightarrow NaClO + NaCl + H_2O$) to produce a N-chloramide. The base (NaOH) removes a proton from the chloramide in order to form an anion. The anion loses a chlorine ion to form a nitrene which undergoes a transposition into an isocyanate.

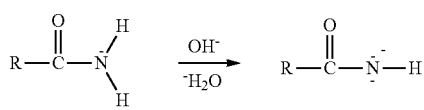

By a reaction between the hydroxide ion and the isocyanate, a carbamate is formed.

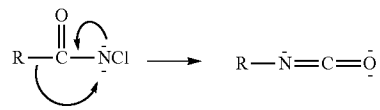

After decarboxylation (elimination of $CO_2$) of the carbamate, a primary amine is obtained.

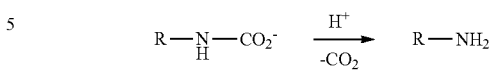

For the conversion of all or part of the amide functions of a polymer comprising an amide group as an amine function, two principal coefficients are involved (expressed in mole ratios). These are:
  Coefficient Alpha=hypohalite (hypohalite of alkali metal and/or hypohalite of alkaline earth metal)/amide functions (and, if applicable, nitrile);
  Coefficient Beta=hydroxide (alkali metal hydroxide and/or alkaline earth hydroxide)/hypohalite (alkali metal hypohalite and/or alkaline earth metal hypohalite).

Although the Hofmann degradation initially relates to amide groups, it can also be applied to nitrile functions ($-C\equiv N$), and in particular those of acrylonitrile polymers.

In general, the effectiveness of the Hofmann degradation polymers as dry strength agents, increases with their cationicity. In other words, in order to increase their cationicity, the polymers used must have a high degree of degradation. Indeed, depending on the Alpha degree of degradation, it is possible to generate different cationicity linked to the quantity of amine functions produced on the polymer carbon skeleton.

The cationicity of the degraded polymer may result from the amine groups formed which can be protonated, but also from the possible presence of a cationic monomer.

Until recently, only heavy processes using, in situ, a Hofmann degradation product production unit (EP 377313), or of processes using another polymer (N-vinylformamide polymer base followed by hydrolysis) also very costly (US 2004/118540), have been developed.

The first viable industrial solution was proposed at the beginning of 2005 in the applicant's document WO2006075115. In this document, the Hofmann degradation product described is an organic polymer produced at a concentration of greater than 3.5% by weight. Although the polymers described in this document can significantly improve the dry strength performances, they have a very low molecular weight, making them of very limited interest for applications such as drainage or flocculation.

Documents WO2008/107620 and WO/2010/061082 of the Applicant made it possible to partially resolve this problem of poor drainage performances. However, the polymers described in these documents show a certain levelling-off of performances in terms of drainage and retention.

Document WO 2009/013423 of the Applicant also made it possible to increase drainage performances by proposing a post-treatment of a polymer resulting from the Hofmann reaction. This post-treatment consists in post-ramifying the copolymer obtained by Hofmann degradation in the presence of at least one polyfunctional ramifying agent. However, this method had severe limitation, with highly complex post-ramiication control (difficult industrialization), as well as saturated performances for dosages greater than 1.5 kg active/per ton of paper.

Document WO 2011/015783 of the Applicant proposes new polymers making it possible to push back saturation performances, in particular for high strengths, on the order of 2 kg active/ton.

Document U.S. Pat. No. 10,730,989 relates to a process for preparing a papermaking (meth)acrylamide copolymer-based additive.

Despite all of these improvements, there remains a persistent problem related to the Hofmann degradation. The double treatment, basic then acidic, combined with the temperature causes a significant drop in viscosity of the base polymer. Polymers obtained this way show reduced applicative performances.

The Applicant has discovered, surprisingly, that the synthesis of a polymer according to the method of the invention, made it possible to increase the molecular weight of the base polymer without impacting its viscosity. It seems that this increase in the molecular weight of the base polymer provides the paper with improved application performances in terms of dry strength, compared with the existing solutions of the prior art, while also improving drainage, thus enabling an increase in the paper machine speed, hence, an improvement in productivity.

The use of the polymers that result from the invention is part of a general principle of product performance improvement, and more particularly, of the dry strength and drainage properties. The improved performance of the polymers according to the invention makes it possible to reduce the quantity of product necessary for the application, which therefore involves a reduction of greenhouse gas emissions such as $CO_2$ associated with the manufacture and use of synthetic polymers. In addition, the improvement in drainage decreases the amount of energy necessary.

DISCLOSURE OF THE INVENTION

This invention relates to a polyvinylamine polymer resulting from the Hofmann degradation reaction on a base polymer comprising:
at least one cationic monomer A;
at least one non-ionic monomer B, selected from acrylamide, acrylonitrile, methacrylamide and mixtures thereof;
at least one structuring system comprising:
at least one compound I selected from: allylsulfonic acid, methallylsulfonic acid, allyldisulfonic acid, methallyldisulfonic acid, their salts and mixtures thereof;
at least one compound II and of formula (1):

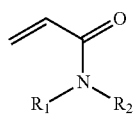

Formula (1)

$R_1$ and $R_2$ being, independently from each other, a hydrogen atom, a methyl group, an ethyl group, an isopropyl group or a $CH_2$—OH group;
$R_1$ and $R_2$ not both being a hydrogen atom ($R_1 \neq H$ when $R_2 = H$; $R_2 \neq H$ when $R_1 = H$)
optionally, at least one monomer C: non-ionic, different from monomer B and different from compound II; zwitterionic or hydrophobic;
optionally, at least one cross-linking agent;
optionally, at least one transfer agent.
This polyvinylamine polymer is obtained according to the following steps:
a) formation of a solution (S1) comprising at least a first fraction (F1) containing (1) at least one monomer selected from monomers A and B and (2) at least one compound selected from compounds I and II;
b) polymerization 1 (PO1) of the fraction F1 to form a solution of a first gradient polymer (PG1);
c) addition to the solution comprising PG1, of a second fraction (F2) containing (1) at least one monomer selected from monomers A and B and (2) at least one compound selected from compounds I and II;
d) polymerization 2 (PO2) of the fraction F2 on PG1 in order to form a solution of a second gradient polymer (PG2);
e) addition, to the solution comprising PG2 of a third fraction (F3) containing (1) at least one monomer selected from monomers A and B and (2) at least one compound selected from compounds I and II;
f) polymerization 3 (PO3) of the fraction F3 on PG2, in order to form a solution comprising a base polymer;
g) dilution of the solution comprising the base polymer and Hofmann degradation reaction on the base polymer in order to obtain a polyvinylamine polymer and
at least one of the fractions F1, F2 or F3 contains at least one monomer A,
at least one of the fractions F1, F2 or F3 contains at least one monomer B,
at least one of the fractions F1, F2 or F3 contains at least one compound I and
at least one of the fractions F1, F2 or F3 contains at least one compound II.

This polymer is free of anionic monomer other than compound I.

This invention also relates to the preparation method for this polyvinylamine polymer.

This invention also relates to a paper or cardboard manufacturing process using this polyvinylamine polymer.

This invention also relates to the use of this polyvinylamine polymer in the recovery of hydrocarbons (oil and/or gas); in the drilling or cementing of wells (specifically, hydrocarbon wells); in the stimulation of hydrocarbon wells (oil and/or gas), for example, in hydraulic fracturing, conformance, diversion; in open, closed or semi-closed circuit water processing; in the treatment of fermentation musts; in the treatment of sludges; in construction; in lumber treatment; in the treatment of hydraulic composition (concrete, cement, mortar and aggregates); in the mining industry; in the formulation of cosmetic products; in the formulation of detergents; in textile manufacturing; in the geothermal sector; in the manufacture of sanitary napkins; or in agriculture.

The invention also relates to the use of the polymer according to the invention as a flocculant, coagulant, binding agent, fixing agent, viscosity-reducing agent, thickening agent, absorption agent, friction-reducing agent, drainage agent, charge-retaining agent, dehydrating agent, conditioning agent, stabilizing agent, fixing agent, film-forming agent, sizing agent, superplasticizer agent, clay inhibitor or dispersant.

Specification of the Invention

"Polymer" is used to designate a copolymer prepared using at least two different monomers, with at least one cationic monomer A and at least one non-ionic monomer B and a structuring system comprising at least one compound I and at least one compound II; it may optionally comprise at least one zwitterionic hydrophilic monomer and/or one hydrophobic monomer and/or a cross-linking agent and/or a transfer agent.

In the context of the invention, the base polymer and the polyvinylamine polymer obtained after Hofmann Degradation of said base polymer are water-soluble polymer.

Water-soluble polymer means a polymer that gives an aqueous solution without insoluble particles when it is dissolved under stirring at 25° C. and with a concentration of 10 g. $L^1$ in deionized water.

In the present invention, the first and second gradient polymers of steps b) and d) are prepolymers.

In the entire specification, viscosities are measured with a Brookfield viscometer, at 25° C. in aqueous solution.

In this specification, it is considered that the person skilled in the art is able to determine the Brookfield viscometer module and speed suitable for the viscosity range to be measured. In fact, this type of measurement is part of the general knowledge of the person skilled in the art.

"X and/or Y" designates "X", or "Y", or "X and Y".

All possible combinations between the different embodiments disclosed, whether these are preferred embodiments or given by way of example, are also part of the invention. In addition, when ranges of values are given, the endpoint values are included in these ranges. The disclosure also includes all combinations between the endpoint values and these values ranges. For example, the values ranges "1-20, preferably 5-15" include the disclosure of the "1-5", "1-15", "5-20" and "15-20" ranges, and the values 1, 5, 15 and 20.

In the specification, a base polymer designates the water-soluble polymer obtained according to the method of the invention before it has undergone the reaction of the Hofmann Degradation according to step g).

Base Polymer

This invention relates to a polyvinylamine polymer resulting from the Hofmann degradation reaction on a base polymer and characterized by the method used to obtain it.

The base polymer according to the invention comprises:
at least one cationic monomer A;
at least one non-ionic monomer B, selected from acrylamide, acrylonitrile, methacrylamide and mixtures thereof;
at least one structuring system comprising:
(i) at least one compound I, different from the at least one monomer A, selected from: allylsulfonic acid, methallylsulfonic acid, allyldisulfonic acid, methallyldisulfonic acid, their salts and mixtures thereof;
(ii) at least one compound II and of formula (1):

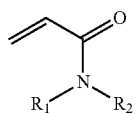

Formula (1)

$R_1$ and $R_2$ being independently from each other, a hydrogen atom, a methyl group, an ethyl group, an isopropyl group or a $CH_2$—OH group;
$R_1$ and $R_2$ are not both a hydrogen atom ($R_1 \neq H$ when $R_2 = H$; $R_2 \neq H$ when $R_1 = H$).

This base polymer is free of anionic monomer other than compound I.

Monomeric Composition

Monomer A

The base polymer according to the invention is a synthetic polymer.

It may comprise one or more cationic monomers (designated "monomer(s) A").

Advantageously, the cationic monomer(s) A may be selected, in particular, from vinylic-type monomers, specifically acrylamide, acrylic, allylic or maleic, with an ammonium function, advantageously quaternary ammonium. In particular, but without limitation, we can mention: diallyldimethyl ammonium chloride, (DADMAC), acrylamido propyltrimethyl ammonium chloride (APTAC), and methacrylamido propyltrimethyl ammonium chloride (MAPTAC) and mixtures thereof. A preferred monomer is diallyldimethyl ammonium chloride, (DADMAC).

The base polymer advantageously comprises between 1 and 60 mol % of cationic monomer(s) A, preferably between 2 and 50 mol %, more preferably between 3 and 40 mol %, more preferably between 4 and 30 mol %.

In a preferred embodiment, the base polymer comprises at least 30 mol % of cationic monomer(s) A.

The person skilled in the art knows how to prepare quaternized monomers, for example by means of alkyl halide of type R—X, R being an alkyl group and X being a halogen, (specifically methyl chloride). In addition, this invention also covers DADMAC, APTAC and MAPTAC type monomers of which the counter-ion halide is fluoride, bromide or iodide instead of chloride.

Monomer B

The base polymer comprises one or more non-ionic monomers (designated "monomer(s) B").

As already indicated, the non-ionic monomer B is selected from acrylamide, acrylonitrile, methacrylamide and mixtures thereof.

The base polymer advantageously comprises between 40 and 99 mol % of non-ionic monomers B, preferably between 50 and 98 mol %, more preferably between 60 and 97 mol %, and even more preferably, between 70 and 96 mol %.

Monomer C

The base polymer may optionally include one or more monomers selected from non-ionic monomers distinct from monomer B and distinct from compound II, zwitterionic monomers, hydrophobic monomers and mixtures thereof (designated "monomers C").

Advantageously, when the monomer C is non-ionic, it may be selected, in particular, from the group comprising water-soluble vinylic monomers. Preferred monomers belonging to this class are, for example, N-vinylpyrrolidone (NVP), N-vinyl imidazole, N-vinyl succinimide, acryloyl morpholine (ACMO), glycidyl methacrylate, glyceryl methacrylate, diacetone acrylamide, N-vinylformamide, N-vinyl-N-methylformamide, N-vinylacetamide, N-vinyl-N-methylacetamide, N-vinyl-N-ethylacetamide, N-vinylpropianamide, N-vinyl-N-methylpropianamide, N-vinylbutyramide, hydroxyalkyl (meth)acrylates (alkyl in $C_1$-$C_3$), thioalkyl (meth)acrylates (alkyl in $C_1$-$C_3$) and mixtures thereof. A preferred monomer is N-vinylformamide.

The base polymer of the invention advantageously comprises between 0 and 40 mol % of non-ionic monomers C distinct from monomer B and compound II, preferably between 0 and 30 mol %.

Advantageously, the zwitterionic monomer(s) that can be used in the context of the invention are selected in particular from derivatives of a vinyl pattern, specifically acrylamide, acrylic, allylic or maleic. Preferably, this monomer comprises an amine or quaternary ammonium function and a carboxylic (or carboxylate) acid-type function, a sulfonic (or sulfonate) acid-type function or a phosphoric (or phosphate) acid-type function. Zwitterionic monomer(s) may be selected from: dimethylaminoethyl acrylate derivatives, such as, 2-((2-9 (acryloyloxy) ethyl) dimethylammonio) ethane-1-sulfonate, may be specifically mentioned but are not limitative, 3-((2-(acryloyloxy) ethyl) dimethylammonio) propane-1-sulfonate, 4-((2-(acryloyloxy) ethyl) dimethylammonio) butane-1-sulfonate, [2-(acryloyloxy) ethyl](dimethylammonio)acetate, derivatives of dimethylaminoethyl methacrylate such as 2-((2-(methacryloyloxy) ethyl) dimethylammonio) ethane-1-sulfonate, 3-((2-(methacryloyloxy) ethyl) dimethylammonio) propane-1-sulfonate, 4-((2-(methacryloyloxy) ethyl) dimethylammonio) butane-1-sulfonate, [2-(methacryloyloxy) ethyl](dimethylammonio)acetate, derivatives of epropylacrylamide dimethylamino such as 2-((3-acrylamidopropyl)dimethylammonio) ethane-1-sulfonate, 3-((3-acrylamidopropyl)dimethylammonio) propane-1-sulfonate, 4-((3-acrylamidopropyl)dimethylammonio) butane-1-sulfonate, [3-(acryloyl)oxy) propyl](dimethylammonio)acetate, dimethylamino propyl methylacrylamide, or even derivatives such as 2-((3-methacrylamidopropyl)dimethylammonio) ethane-1-sulfonate, 3-((3-me dimethylammonio) propane-1-sulfonate 4-((3-methacrylamidopropyl)dimethylammonio) butane-1-sulfonate and propyl [3-(methacryloyloxy)](dimethylammonio)acetate and mixtures thereof.

Other zwitterionic monomers are described by the Applicant in document WO2021123599.

The base polymer according to the invention advantageously comprises between 0.001 and 30 mol % of zwitterionic monomers C, preferably between 0.01 and 20 mol %, more preferably between 0.1 and 15 mol %.

Advantageously, hydrophobic monomer(s) C may be selected from groups consisting of esters of (meth)acrylic acid presenting an alkyl chain in $C_4$-$C_{30}$, arylalkyl (alkyl in $C_4$-$C_{30}$, aryl in $C_4$-$C_{30}$), propoxylated, ethoxylated, or ethoxylated and propoxylated; derivatives of (meth)acrylamide presenting an alkyl chain in $C_1$-$C_3$, propoxylated arylalkyl (alkyl in $C_4$-$C_{30}$, aryl in $C_4$-$C_{30}$), ethoxylated, ethoxylated and propoxylated, or dialkyl (alkyl in $C_4$-$C_{30}$); alkyl aryl sulfonates (alkyl in $C_4$-$C_{30}$, aryl in $C_4$-$C_{30}$), or by mono- or di-substituted amides of (meth)acrylamide presenting an alkyl chain in $C_4$-$C_{30}$, arylalkyl (alkyl in $C_4$-$C_{30}$, aryl in $C_4$-$C_{30}$), propoxylated, ethoxylated, or ethoxylated and propoxylated; derivatives of (meth)acrylamide presenting an alkyl chain in $C_4$-$C_{30}$, arylalkyl propoxylated (alkyl in $C_4$-$C_{30}$, aryl in $C_4$-$C_{30}$), ethoxylated, ethoxylated and propoxylated, or dialkyl in $C_4$-$C_{30}$; alkyl aryl sulfonates (alkyl in $C_4$-$C_{30}$, aryl in $C_4$-$C_{30}$) and mixtures thereof.

The base polymer generally comprises less than 1 mol % of hydrophobic monomers C. It may be free of hydrophobic monomer C.

When the base polymer according to the invention comprises one or more hydrophobic monomers C, they are present in an amount such that the polymer remains water-soluble.

Quantities of the different monomers will be adjusted by the person skilled in the art in order to not exceed 100 mol % during the preparation of the base polymer Preferably, monomers A and B represent 100 mol % of the monomers of base polymer.

Structuring System

The structuring system of the base polymer comprises:
(i) at least one compound I;
(ii) at least one compound II.

The compound I is advantageously selected from: allylsulfonic acid, methallylsulfonic acid, disulfonic ally acid, disulfonic methallyl acid, their salts and mixtures thereof, preferably this is methallysulfonic acid, for example, sodium methallylsulfonate.

The salified form advantageously corresponds to the metal alkaline salts (Li, Na, K . . . ), to alkaline earth metal salts (Ca, Mg . . . ) or to ammonium salts (for example, to ammonium ion or a tertiary ammonium). Sodium salts are the preferred salts.

The base polymer advantageously comprises between 500 and 50,000 ppm of compound I based on the total weight of monomers A and B (+optionally, monomer C) of the base polymer, preferably between 1,000 and 20,000 ppm, more preferably between 2,000 and 10,000 ppm.

The compound II that is used in the context of the invention is of formula (1):

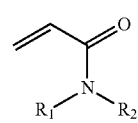

Formula (1)

$R_1$ and $R_2$ being, independently of each other, a hydrogen atom, a methyl group, an ethyl group, an isopropyl group or a $CH_2$—OH group; $R_1$ and $R_2$ not both being a hydrogen atom ($R_1 \neq H$ when $R_2 = H$; $R_2 \neq H$ when $R_1 = H$).

The compound II used is advantageously selected from: N,N-dimethylacrylamide, N,N-diethylacrylamide, N,N-isopropylacrylamide, N-methylolacrylamide and mixtures thereof. Preferably, it is N,N-dimethylacrylamide.

The base polymer according to the invention advantageously comprises between 500 and 50,000 ppm of compound II based on the total weight of monomers A and B (+optionally, monomer C) of the base polymer, preferably between 1,000 and 20,000 ppm, more preferably between 2,000 and 10,000 ppm.

In the base polymer, the mass ratio between compound I and compound II is advantageously comprised between 0.01 and 100, preferably between 0.1 and 10.

In a preferred mode according to the invention, the quantity of compound I is greater than the quantity of compound II. Thus, the mass ratio between compound I and compound II is advantageously greater than 1 and less than or equal to 100, preferably greater than 1 and less than or equal to 10.

Optional

The base polymer may further comprise at least one crosslinker. This crosslinker can be selected from polyethylene unsaturated monomers (having a minimum of two unsaturated functions), such as, for example, vinyl functions, specifically allylic, acrylic, or from monomers having at least two epoxy functions. For example, methylene bis acrylamide (MBA), triallyamine, tetraallylammonium chloride, 1,2 dihydroxyethylene bis-(N-acrylamide) and mixtures thereof can be cited. Preferably, it is methylene bis acrylamide (MBA).

The quantity of crosslinker in the base polymer is advantageously comprised between 5 and 5,000 ppm, based on the total weight of monomers A and B (+optionally, monomer C) of the base polymer, more preferably between 50 and 3,000 ppm.

In a particular embodiment according to the invention, the base polymer does not comprise a crosslinker.

The base polymer according to the invention may also comprise at least one transfer agent, for example, selected from methanol, isopropyl alcohol, sodium hypophosphite, 2-mercaptoethanol and mixtures thereof. Other transfer agents include xanthate, dithiocarbonate, dithiocarbamate and trithiocarbonate types, and mixtures thereof can also be cited, preferably it will be sodium hypophosphite.

The quantity of crosslinker in the base polymer is advantageously comprised between 10 and 10,000 ppm, based on the total weight of monomers A and B (+optionally, monomer C) of the base polymer, more preferably between 50 and 5,000 ppm.

In a particular embodiment according to the invention, the base polymer does not comprise a transfer agent.

Physical Characteristics of the Base Polymer

The base polymer has a weight average molecular weight advantageously comprised between 1,000,000 and 25,000,000 daltons, preferably between 2,000,000 and 15,000,000 daltons, more preferably between 3,000,000 and 10,000,000 daltons. This is the weight average molecular weight.

The weight average molecular weight is, preferably, measured by gel permeation chromatography coupled to a MALS detector.

The base polymer is advantageously obtained and used in liquid form.

The viscosity of the solution comprising the base polymer is advantageously comprised between 1,000 and 50,000 cps, preferably between 3,000 and 20,000 cps, for instance between 5,000 and 20,000 cps.

Renewable Origin

In a preferred embodiment according to the invention, the polyvinylamine polymer is prepared using monomers of at least partially renewable and non-fossil origin.

In the context of the invention, the phrase "of renewable and non-fossil origin" designates the origin of a chemical compound issuing from biomass or synthetic gas (syngas), namely, one that is the result of one or more chemical transformations performed on one or more raw materials of natural, and non-fossil, origin. The terms "bio-sourced" or "bio-resourced" can also be used to characterize the renewable and non-fossil origin of a chemical compound. The renewable and non-fossil origin of a compound includes renewable and non-fossil raw materials coming from the circular economy, and which have been previously recycled, one or more times, during a recycling process of material coming from biomass, such as, for example, material coming from polymer depolymerization or from the transformation of pyrolysis oil.

According to the invention, "at least partly of renewable and non-fossil origin" means a content of bio-sourced carbon comprised between 5% by weight and 100% by weight based on the total carbon weight of said compound, preferably at least 30%, more preferably at least 50%, even more preferably at least 70%, more preferably at least 90% and even more preferably, at least 100% bio-sourced carbon.

In the context of the invention, the standard ASTM D6866-21, method B is used to characterize the bio-sourced nature of a chemical compound, and to determine the bio-sourced content of said compound. The value is expressed in percentage by weight of bio-sourced carbon based on the total weight of carbon in said compound.

Gradient

The base polymer and the polyvinylamine polymer according to the invention are gradient polymers.

Polymers with a gradient structure are polymers composed of at least two monomers in which the change of composition of monomers is gradual, unlike bloc polymers, which undergo an abrupt change in composition, and unlike random polymers, which do not have a continuous change in composition. In a gradient polymer, due to the gradual change in composition over the length of the polymer chain, less inter-chain and intra-chain repulsion is observed.

The gradient can be formed by a spontaneous or forced gradient. Spontaneous gradient polymerization is due to a different monomer reactivity. Forced gradient polymerization involves varying the monomer composition introduced throughout the polymerization time.

A gradient forced method comprises (1) the introduction of a first fraction of monomers into a reactor, (2) the addition of at least one additional monomer fraction advantageously different from the first and (3) the polymerization of the monomers introduced into the reactor. The polymerization of the monomers is initiated with the introduction of the first fraction.

The addition of the additional monomer fraction may be done in parallel with the introduction of the first fraction of monomers into the reactor (the introduction of fractions can, therefore, begin and end at the same time). Alternatively, the beginning of the first monomer feed (first fraction) into the reactor may precede the beginning of the addition of a second monomer fraction. Alternatively, a first and a second fraction can be introduced simultaneously, but the time taken to add the second fraction may be longer than the time taken to add the first fraction into the reactor. This embodiment is also applicable to methods with at least 3 monomer fractions.

According to the method of the invention, the polyvinylamine polymer obtained is formed by the sequential addition of monomers, i.e., it is preferably a forced gradient method.

The method according to the invention comprises a first fraction (F1) and at least two additional fractions (F2 and F3). At least one of fractions F1, F2 and F3 of the method is different from the other fractions. Preferably, fractions F1, F2 and F3 are different. By different fraction, we mean a fraction with a different monomer composition (ratio and/or nature of the monomers) and/or of compounds I and II (ratio and/or nature of compounds I and II).

Polymerization Method

This polyvinylamine polymer is obtained according to the following steps:

a) formation of a solution (S1) comprising at least a first fraction (F1) containing (1) at least one monomer selected from monomers A and B and (2) at least one compound selected from compounds I and II;

b) polymerization 1 (PO1) of fraction F1 to form a solution of a first gradient polymer (PG1); c) addition to the solution comprising PG1, of a second fraction (F2) containing (1) at least one monomer selected from monomers A and B and (2) at least one compound selected from compounds I and II;

d) polymerization 2 (PO2) of the fraction F2 on PG1 in order to form a solution of a second gradient polymer (PG2);

e) addition, to the solution comprising PG2 of a third fraction (F3) containing (1) at least one monomer selected from monomers A and B and (2) at least one compound selected from compounds I and II;

f) polymerization 3 (PO3) of the fraction F3 on PG2, in order to form a solution comprising a base polymer;

g) dilution of the solution comprising the base polymer and Hofmann degradation reaction on the base polymer in order to obtain a polyvinylamine polymer.

This method may include the addition of additional fractions, but none after step g) of Hofmann degradation.

It is possible that the improved performances of polymers obtained according to the method of the invention may be due to the fact that polymerization is carried out sequentially and continuously, that is, without interruption.

By "sequentially", we mean that the polymerization of the base polymer monomers is done in several fractions, without being interrupted, i.e., fractions are added continuously and the polymerization does not stop. The different steps a) to f) are done sequentially. In other words, a first fraction of monomers can be poured (in a flow form) and polymerizes to form a first gradient polymer (PG1), which continues to polymerize with the fraction F2, forming gradient polymer PG2, which itself continues to polymerize with fraction F3 in order to obtain, at the end of polymerization, the base polymer. At least one of fractions F1, F2 and F3 is different from the other fractions. Preferably, fractions F1, F2 and F3 are different. The addition of different fractions during the polymerization method makes is possible to obtain a gradient in the base polymer composition.

In a particular embodiment, the polymerization can be stopped after PO1 and/or PO2 and continued in a different localization. In this embodiment, the fraction $F_{X+1}$ (X=1 or 2) added to the gradient polymer $PG_X$ formed during the previous step(s), polymerizes and interacts with $PG_X$ to form $PG_{X+1}$ and the process continues at the following step to eventually obtain the base polymer.

Step g) is performed on the base polymer once polymerization is complete. It may be done consecutively to the end of polymerization, or at another time (later). Preferably, it is done consecutively to PO3. In other words, the base polymer used for step g) no longer continues to polymerize. However, it undergoes a post-treatment which modifies its chemical structure. Step g) is advantageously carried out in a different reactor from the polymer base synthesis reactor as it requires the dilution of the solution comprising the base polymer. Dilution of the base polymer is advantageously done in water.

The Hofmann degradation of step g) is advantageously performed on polymers with amide groups.

In the polymerization method according to the invention, the total sum of mol percentages of the monomers of the different fractions is equal to the total sum of the mol percentages of the monomers of the polyvinylamine polymer.

Step a), Formation of a Solution (S1) Comprising a First Fraction (F1)
Solution (S1)
   Solution S1 generally comprises:
   a solvent;
   an initiator;
   a first fraction F1.

The solvent is advantageously water, or a solvent in which the monomers and the base polymer are soluble. Preferably, the solvent is water.

The polymerization initiators used can be any compounds that dissociate into radicals under polymerization conditions, for example: organic peroxides, hydroperoxides, hydrogen peroxide, persulfates, azo compounds and redox pairs. The use of water-soluble initiators is preferred. In some cases, it is advantageous to use mixtures of various polymerization initiators, for example, mixtures of redox catalyst and of azo compounds. Preferred initiators are persulfates.

In one particular embodiment, solution S1 is formed by mixing the solvent, the initiator and fraction F1 in a polymerization reactor.

In this particular embodiment, the fraction F1 may be added at once, in several additions or poured (in a flow form), i.e. progressively continuously (for example, drop-wise), to the solvent/initiator mixture. Preferably, the fraction F1 is added at once to the polymerization reactor.

In a particular embodiment of the invention, the initiator and the fraction F1 are poured (in a flow form) to a polymerization reaction comprising the solvent. They may be added separately or mixed beforehand. Preferably, they are added separately.

In a preferred embodiment of the invention, the initiator is added continuously throughout the polymerization process. In this case, the initiator is advantageously added in parallel with the different fractions, during the different polymerization steps and during possible aging steps of the different gradient polymers (PG1 and PG2) and of the base polymer.

In this preferred embodiment of the invention, the duration of the initiator pouring is between 50 minutes and 560 minutes, preferably between 130 minutes and 430 minutes.
First Fraction (F1)

Advantageously, fraction F1 comprises between 10 and 45% by weight of monomer (A and/or B, +optionally C) based on the total weight of monomer (A and/or B, +optionally C) of the base polymer, preferably between 15 and 40% weight.

Fraction F1 advantageously comprises between 0 and 65 mol % of cationic monomer(s) A, preferably between 5 and 55 mol %, based on the total number of moles of monomers in fraction F1.

Fraction F1 advantageously comprises between 35 and 100 mol % of non-ionic monomer(s) B, preferably between 45 and 95%, based on the total number of moles of monomers in fraction F1.

Fraction F1 advantageously comprises between 250 and 30,000 ppm of compound I based on the total weight of monomers A and B (+optionally, monomer C) of the base polymer, preferably between 500 and 10,000 ppm, more preferably between 1,000 and 7,000 ppm.

Fraction F1 advantageously comprises between 250 and 30,000 ppm of compound II based on the total weight of monomers A and B (+optionally, monomer C) of the polyvinylamine polymer, preferably between 500 and 10,000 ppm, more preferably between 1,000 and 5,000 ppm.

The different monomers and compounds constituting the fraction F1 are advantageously added in the form of solutions. These solutions can be added separately or in a mixture to the polymer reactor, at once, in several additions or poured (in a flow form), in order to form the solution S1. Preferably, the addition occurs as a mixture and added at once.

When the fraction F1 is poured (in a flow form), the pouring advantageously lasts between 10 minutes and 80 minutes, preferably between 40 minutes and 70 minutes.

In a preferred embodiment, fraction F1 is prepared in the reactor (polymerization reactor) before the addition of initiator.

In a preferred embodiment, fraction F1 contains at least one monomer B, at least one compound I and at least one compound II.

In a preferred embodiment, fraction F1 contains at least one monomer A, at least one monomer B, at least one compound I and at least one compound II.
Step b), Polymerization of Fraction F1 to Form a First Gradient Polymer (PG1)
Polymerization 1 (PO1)

Prior to polymerization PO1, the atmosphere in the polymerization reactor can be replaced by an inert gas such as, for example, nitrogen or argon.

Polymerization PO1 is generally a radical polymerization. Polymerization initiators can be used, specifically initiators that dissociate into radicals under polymerization conditions.

Polymerization PO1 is generally initiated at a temperature comprised between 7° and 90° C., preferably between 75 and 85° C., with the polymerization temperature then being controlled using a cooling means in order to not exceed 95° C.

Polymerization PO1 lasts, preferably, between 10 minutes and 70 minutes.

Advantageously, polymerization begins when the first monomers, the solvent and the initiator are in contact, in other words, the duration of polymerization PO1 corresponds, advantageously, to the duration of the pouring of fraction F1.

Gradient Polymer (PG1)

At the end of polymerization PO1, a gradient polymer (PG1) is obtained.

In a particular embodiment of the invention, the gradient polymer PG1 is left to age between 5 minutes and 60 minutes, preferably between 10 minutes and 30 minutes.

"left to age" means that the temperature of the medium is maintained between 8° and 90° C. after the end of polymerization in order to enable an increase in viscosity through polymer internal branching phenomena. This definition of aging applies to all the steps of the polymerization method.

Step c) Addition of a Second Fraction (F2) to the Solution Comprising PG1

Second Fraction F2

Advantageously, fraction F2 comprises between 30 and 80% by weight of monomer (A and/or B, +optionally C) based on the total weight of monomer (A and/or B, +optionally C) of the base polymer, preferably between 40 and 70% weight.

Fraction F2 advantageously comprises between 0 and 50 mol % of cationic monomer(s) A, preferably between 0 and 40 mol %, based on the total number of moles of monomers in fraction F2.

Fraction F2 advantageously comprises between 0 and 100 mol % of non-ionic monomer(s) B, preferably between 60 and 100%, based on the total number of moles of monomers in fraction F2.

Fraction F2 advantageously comprises between 250 and 30,000 ppm of compound I based on the total weight of monomers A and B (+optionally, monomer C) of the base polymer, preferably between 500 and 10,000 ppm, more preferably between 850 and 5,000 ppm, for instance between 1,000 and 5,000 ppm.

Fraction F2 advantageously comprises between 250 and 30,000 ppm of compound II based on the total weight of monomers A and B (+optionally, monomer C) of the base polymer, preferably between 500 and 10,000 ppm, more preferably between 1,000 and 5,000 ppm.

The different monomers and compounds constituting F2 are advantageously added in the form of solutions. The solutions can be added separately or in a mixture to the polymer reactor, at once, in several additions or poured (in a flow form). Preferably, the addition is made as a mixture and poured (in a flow form).

The addition of the fraction F2 in a flow form (for example dropwise) allows controlling the exothermicity of the reaction that may otherwise be too high even when using a cooler.

The pouring of the fraction F2 advantageously lasts between 10 minutes and 100 minutes, preferably between 30 minutes and 90 minutes.

In a preferred embodiment, fraction F2 contains at least one monomer A and B, at least one compound I and at least one compound II.

Step d), Polymerization of Fraction F2 on PG1 to Form a Second Gradient Polymer (PG2)

Polymerization (PO2)

The polymerization PO2 occurs as a continuation of the polymerization PO1; it occurs under the same temperature conditions (advantageously 70 to 90° C.).

Polymerization PO2 lasts, advantageously, between 10 minutes and 100 minutes, preferably between 30 and 90 minutes.

Polymerization PO2 begins with the addition of the first monomers of fraction F2.

Advantageously, the duration of polymerization PO2 corresponds with the duration of the pouring of fraction F2.

Gradient Polymer (PG2)

At the end of polymerization PO2, a gradient polymer (PG2) is obtained.

In a particular embodiment of the invention, the PG2 link is left to age between 5 minutes and 60 min, preferably between 10 minutes and 30 min.

Step e) Addition of a Third Fraction (F3) to the Solution Comprising PG2

Fraction F3

Advantageously, fraction F3 comprises between 5 and 40% by weight of monomer (A and/or B, +optionally C) based on the total weight of monomer (A and/or B, +optionally C) of the base polymer, preferably between 10 and 30% weight.

Fraction F3 advantageously comprises between 0 and 50 mol % of cationic monomer(s) A, preferably between 0 and 35 mol %, based on the total number of moles of monomers in fraction F3.

Fraction F3 advantageously comprises between 50 and 100 mol % of non-ionic monomer(s) B, preferably between 65 and 100%, based on the total number of moles of monomers in fraction F3.

Fraction F3 advantageously comprises between 0 and 10,000 ppm of compound I based on the total weight of monomers A and B (+optionally, monomer C) of the base polymer, preferably between 10 and 5000 ppm, more preferably between 20 and 1,000 ppm.

Fraction F3 advantageously comprises between 0 and 10,000 ppm of compound II based on the total weight of monomers A and B (+optionally, monomer C) of the base polymer, preferably between 0 and 1,000 ppm.

The different monomers and compounds constituting F3 are advantageously added in the form of solutions. These solutions can be added separately or in a mixture to the polymer reactor, all at once, in several additions or poured (in a flow form), i.e. dropwise. Preferably, the addition occurs in a mixture and poured (in a flow form).

The addition of the fraction F3 in a flow form (for example dropwise) allows controlling the exothermicity of the reaction that may otherwise be too high even when using a cooler.

The pouring of the fraction F3 advantageously lasts between 10 minutes and 100 minutes, preferably between 30 minutes and 90 minutes.

In a preferred embodiment, fraction F3 contains at least one monomer B and at least one compound I.

In an embodiment, the amount of compound I in fraction F3 is less than 500 ppm, preferably less than 300 ppm, preferably less than 200 ppm and even more preferably less than 100 ppm.

Such a small amount enables reaching the desired physical and unique properties of the base polymer and subsequently of the final polyvinylamine polymer.

Step f), Polymerization of Fraction F3 on PG2 to Form a Base Polymer
Polymerization (PO3)

Polymerization PO3 is performed in the continuity of polymerization PO2; it is performed under the same time and temperature conditions as PO2 (advantageously, 70 to 90° for 10 to 100 minutes, preferably between 30 and 90 minutes).

Polymerization PO3 begins with the addition of the first monomers of fraction F3.

Advantageously, the duration of polymerization PO3 corresponds with the duration of the pouring of fraction F3.

At the end of polymerization PO3, the base polymer is obtained.

In a particular embodiment of the invention, the base polymer is left to age between 5 minutes and 60 minutes, preferably between 10 minutes and 30 minutes, before the elimination of the residual monomers.

The reaction is stopped by addition of an excess of initiator and/or of water; this step is used to eliminate possible residual monomers present in the solution comprising the base polymer.

Optional Steps

The method according to the invention can also comprise additional steps and is not limited to the steps described above.

In a particular embodiment of the invention, the polymerization method according to the invention can include the addition of additional fractions constituting the base polymer.

In a preferred embodiment of the invention, the base polymer is left to age between 10 minutes and 100 minutes after step f) of polymerization PO3 and prior to step g), preferably between 30 minutes and 90 minutes. In the case of the addition of additional fractions, the aging is done after the last polymerization step and before step g).

In a particular embodiment of the invention, a crosslinker and/or transfer agent is added during at least one of the steps described above.

In a particular embodiment of the invention, the crosslinker is added in fraction F1 and/or in fraction F2.

When a crosslinker is added, it is advantageously selected from the crosslinkers cited above.

When a crosslinker is added, its quantity is advantageously between 5 and 5,000 ppm based on the total weight of the base polymer (monomers A, B and optionally C), preferably between 50 and 3,000 ppm.

In a particular embodiment of the invention, the transfer agent is added in fraction F1 and/or in fraction F2.

When a transfer agent is added, it is advantageously selected from the transfer agents cited above.

When a transfer agent is added, its quantity is advantageously comprised between 10 and 10,000 ppm based on the total weight of the base polymer (monomers A, B and optionally C), preferably between 50 and 5,000 ppm.

Step g) Hofmann Degradation Reaction on the Base Polymer in Order to Obtain the Polyvinylamine Polymer.

The Hofmann degradation reaction consists in converting amide or nitrile functions into amine functions (for example, by formation of vinylamine monomeric units) using two principal coefficients (expressed in molecular ratios);

Coefficient Alpha=hypohalite (hypohalite of alkali metal and/or hypohalite of alkaline earth metal)/amide and/or nitrile functions;

Coefficient Beta=hydroxide (alkali metal hydroxyde and/or alkaline earth hydroxide)/hypohalite (alkali metal hypohalite and/or alkaline earth metal hypohalite).

A hypohalite is an oxy-anion, for example, hypochlorite $ClO^-$. Preferably, it will be sodium hypochlorite.

An "alkaline hypohalite" is a hypohalite of at least one alkaline metal, for example, NaOCl, KOBr or NaOCl+KOBr. The same is true for an alkaline-earth hypohalite.

"Alkaline" is used to designate an alkaline metal, advantageously, lithium, sodium or potassium.

"Earth-alkaline" is used to designate an alkaline-earth metal, advantageously, calcium or magnesium.

"Alkaline hydroxide" is used to designate a hydroxide ($OH^-$) of at least one alkaline metal, for example, NaOH, KOH or NaOH+KOH. The same is true for alkaline-earth hydroxide. Preferably, it will be sodium hydroxide.

Advantageously, the Hofmann degradation reaction comprises at least the following steps: g1) dilution (advantageously in water) of the solution comprising the base polymer in order to form a diluted base polymer solution (SD1);

g2) addition of a hypohalite and hydroxide to SD1 to form a diluted solution (SD2);

g3) reaction between the base polymer, the hypohalite and the hydroxide;

g4) obtaining of a solution comprising the polyvinylamine polymer (SD3).

Advantageously, in step g1), the concentration of the base polymer in diluted solution SD1 of the base polymer is comprised between 1 and 40% by weight based on the weight of SD1, more preferably between 2 and 30%, and even more preferably between 5 and 25%.

Advantageously, in step g2), the Alpha coefficient=hypohalite/amide and or nitrile functions is comprised between 0.1 and 1.0, preferably between 0.3 and 1.0, and more preferably between 0.5 and 1.0.

Advantageously, in step g2), the Beta coefficient=hydroxide/hypohalite is comprised between 0.5 and 4.0.

Advantageously, in step g3), the reaction between the base polymer, the hypohalite and the hydroxide lasts between 10 seconds and 180 minutes, preferably between 1 minute and 120 minutes, more preferably between 10 minutes and 90 minutes and even more preferably between 30 minutes and 75 minutes.

Advantageously, in step g3), the reaction between the base polymer, the hypohalite and the hydroxide is performed at a temperature comprised between 1° and 30° C., preferably between 15 and 25° C.

At the end of step g3), the polyvinylamine polymer according to the invention is obtained.

In a particular embodiment of the invention, at the end of step g3), the polyvinylamine polymer can be functionalized with a dialdehyde in order to produce an aldehyde-functionalized polymer (advantageously glyoxalated).

The dialdehyde is advantageously selected from glyoxal, glutaraldehyde, furane-dialdehyde, adipaldehyde, succinaldehyde, dialdehyde starch, 2,2 dimethoxyethanal, diepoxy compounds and mixtures thereof. Preferably, it will be glyoxal.

In order to stabilize the amine functions that are produced, the skilled person in the art may add, to the diluted solution SD1, at least one derivative of quaternary ammonium as described in document JP 57077398. This quaternary ammonium derivative is intended to prevent the reaction between the amine functions and the residual amide functions. In addition, the addition of these agents can be done separately, simultaneously, in mixture or not, in any order of introduction, and at one or more injection points. The addition of these agents is advantageously done during step g1).

In a preferred embodiment of the invention, the pH of solution SD3 is adjusted, by the addition of acid, to between 0.5 and 7.5, more preferably between 1.0 and 3.0. The adjustment of the pH is advantageously done in the absence of the functionalization of the polyvinylamine polymer by a compound comprising at least two aldehyde functions.

During the Hofmann degradation, the cationicity of the base polymer increases due to the use/consumption, in totality or not, of an alkaline or alkaline earth hypohalite.

The polyvinylamine polymer advantageously has a cationic charge density greater than 2 meq/g, preferably greater than 5 meq/g and advantageously less than 12 meq/g, preferably less than 11.5 meq/g.

In a particular embodiment of the invention, a micro-cellulose compound is made to react with the polyvinylamine polymer.

Advantageously, the micro-cellulose compound is in the form of a suspension in water.

Advantageously, during this reaction with the micro-cellulose compound, the mass concentration of polyvinylamine polymer is comprised between 0.5 and 20% in aqueous solution, preferably between 1 and 5%.

The reaction between a micro-cellulose compound and the polyvinylamine polymer is advantageously performed in the absence of functionalization of the polyvinylamine polymer by a dialdehyde.

The reaction between a micro-cellulose compound and the polyvinylamine polymer is advantageously performed at a temperature between 10° C. and 60° C., preferably between 2° and 40° C.

Advantageously, the micro-cellulose compound is selected from nano-fibrillated cellulose, micro-fibrillated cellulose, nano crystalline cellulose, nano cellulose.

Advantageously, between 10% and 100% by weight of the micro-cellulose compound is added to the polyvinylamine polymer, based on the weight of the polyvinylamine polymer, preferably between 10 and 50%.

Even though it is prepared in solution, the polyvinylamine polymer of the invention can be used in solid form. Under these conditions, the solid form contains not only the polymer, but also a proportion of salt obtained at the end of the Hofmann degradation. In practice, the solid form is obtained, among other ways, by methods consisting of drying the solution of step g). The technical principles of solid/liquid isolation are those of drying by atomization or spraying (which consists of creating a cloud of fine droplets in a hot gaseous current for a controlled period of time), of drum drying, fluidized bed dryers.

Papermaking Method

This invention also relates to a paper or cardboard manufacturing method comprising (1) the addition of a polyvinylamine polymer according to the invention into an aqueous solution of fibers and (2) the formation of a sheet of paper or cardboard. Thus, the invention relates to the use of a polyvinylamine polymer in a papermaking method.

The different steps in a papermaking production method, cardboard or the like are known and comply with techniques that are part of the knowledge of the skilled person in the art, it is not necessary to describe them in further detail, because they are known and classic within what the person skilled in the art knows. If necessary, they can refer to the document: Handbook for Pulp & Paper Technologists, 4$^{th}$ Edition, G. A. Smook.

According to the invention, the polyvinylamine polymer is added in the papermaking process, before or after the formation of the sheet of paper, cardboard or the like. Thus, putting the cellulose material in contact with the polymer of the invention can be done in different ways and specifically according to the typical methods known to the person skilled in the art.

The polyvinylamine polymer can be added to the cellulose material in the form of a diluted or undiluted aqueous solution. It can be applied by an impregnation technique or it can be added directly to the fibrous suspension at any place in the paper manufacturing method where dry strength agents are usually introduced.

Thus, the polymer according to the invention can be introduced into thick stock or into thin stock. It can be added at the mixing pump, before the headbox or filter sieve. Preferably, the polymer is introduced before the headbox.

Preferably, the polymer according to the invention is industrially injected into the fibrous suspension, i.e., before its dilution by white water (thick stock). The consistency of the stock is on the order of 1 to 5% by mass of cellulose fibers.

The papermaking method according to the invention can be implemented with any type of paper pulp, such as, for example, virgin fiber pulp (Kraft, Bisulfite), recycled fibers, de-inked pulps, mechanical and thermo-mechanical pulps.

The polyvinylamine polymer is advantageously added before the formation of the sheet, directly into the fibrous suspension.

It can be added at a single injection point, or at two injection points.

The papermaking method according to the invention may also include the addition of other additives and/or polymers, according to needs; by way of example and without limitation, we can mention: biocides, coagulants, retention agents, flocculants, starch.

Use

This invention also relates to the use of this polyvinylamine polymer in the recovery of hydrocarbons (oil and/or gas); in the drilling or cementing of wells (specifically, hydrocarbon wells); in the stimulation of hydrocarbon wells (oil and/or gas), for example, in hydraulic fracturing, conformance, diversion; in open, closed or semi-closed circuit water processing; in the treatment of fermentation musts; in the treatment of sludges; in construction; in lumber treatment; in the treatment of hydraulic composition (concrete, cement, mortar and aggregates); in the mining industry; in the formulation of cosmetic products; in the formulation of detergents; in textile manufacturing; in the geothermal sector; in the manufacture of sanitary napkins; or in agriculture.

The Invention also relates to the use of the polyvinylamine polymer as a flocculant, coagulant, binding agent, fixing agent, viscosity-reducing agent, thickening agent, absorption agent, friction-reducing agent, drainage agent, charge-retaining agent, dehydrating agent, conditioning agent, stabilizing agent, fixing agent, film-forming agent, sizing agent, superplasticizer agent, clay inhibitor or dispersant.

The inventions and the advantages that result from it will be more clearly highlighted in the following examples, given to illustrate the invention, but not intended to limit its uses.

EXAMPLES

List of Abbreviations

DADMAC: Diallyldimethyl ammonium (monomer A)
AMD: Acrylamide (monomer B)
DMAM: Dimethylacrylamide (compound II)
SMS: Methallyl sodium sulfonate (compound I)
SPS: Sodium persulfate (polymerization initiator)

MBA: Methylene bis acrylamide (crosslinking agent)
PEI: Polyethyleneimine

Description of the Characterization of the GPC-MALS Molecular Weight

Gel permeation chromatography is a method of separating macromolecules as a function of their hydrodynamic volume; it is coupled with MALS detection, making it possible to measure the diffusion of light from several angles.

Synthetic polymers are analyzed under the following conditions:
Instrument: GPC-2
Columns: Shodex SB-807-HQ & SB-805 custom
Method:
Temperature: 30° C.
Mobile phase: 0,5M $NaNO_3$, HEPES (pH=8), 100 ppm $NaN_3$
Injection: 100p L
Flow: 0.3 mL/min
Detection:
(i) Light diffusion detector (MALS): Absolute molar mass
(ii) Refractometry (RI): Concentration Viscosity is measured using a Brookfield viscometer, at 25° C., with a Brookfield LV1 module, speed 60 rpm.

Preparation of the Polymers 1 According to the Invention (P1 (INV))

Polymer 1 (P1)

First Sequence: Gradient Polymer PG1

In a 1-liter reactor equipped with a mechanical stirrer, a thermometer, a condenser and a nitrogen gas dipping rod, a first fraction F1 is introduced at the foot of the reactor, composed of 146.9 g of water, 50.6 of acrylamide (50% by weight in water), 77.1 g of dimethyldiallyl ammonium chloride (64% by weight in water), 1 g of citric acid, 0.5 g of dimethylacrylamide and 0.4 g of sodium methallyl sulfonate. The medium is heated and maintained at a temperature between 79 and 81° C. using a water bath. An addition of 0.05 g sodium persulfate makes it possible to initiate this starter and to start the polymerization of the monomers (PO1) in order to form a solution of a first gradient polymer PG1.

Second Sequence: Gradient Polymer PG2

When the exothermic reaction ends, the pouring starts: an initiator (50 g of SPS at 0.33% by weight in water) is poured in 130 minutes and simultaneously, a second fraction F2, composed of 25.5 g of water, 101.3 g of acrylamide (50% by weight in water), 77.1 g of DADMAC (64% by weight in water), 0.5 g of dimethylacrylamide and 0.19 g of sodium methallyl sulfonate, for 50 minutes. Once fraction F2 is poured, the gradient polymer PG2 is left to age for 10 minutes (polymerization PO2 to form the gradient polymer PG2 takes place during the pouring of fraction F2 and during aging).

Third Sequence: Base Polymer

Then, we begin to pour a third fraction F3, composed of 121.3 g of water, 50.6 g of acrylamide (50% by weight in water), 0.01 g of methallyl sodium sulfonate, over 60 minutes. At the end of the addition of fraction F3, the polymer is left to age for 10 minutes (polymerization PO3 to form the base polymer takes place during the pouring of fraction F3 and during aging).

Once aging is completed, 146.9 g of water are added, as well as 0.15 g of sodium persulfate. When the desired viscosity is attained, the reaction is stopped by an addition of 0.6 g of soda bisulfite (40% by weight in water) and 146.9 g of water. A new aging period of 60 minutes is applied before cooling. The solution comprising the base polymer 1 obtained has a pH of 3.5 and active material of 20% by weight, a viscosity of 3,500 cps and a molecular weight obtained by GPC-MALS of 2,650,000 Da.

Hofmann Degradation: Polymer 1 (P1)

The Hofmann degradation is performed according to the method of the applicant described in document WO2010061082. At the end of the Hofmann degradation, the polyvinylamine polymer according to the invention (P1 (INV)) is obtained.

Preparation of Comparative Examples Polymers 2 to 3 (CE1 to CE2)

Polymer 2 (CE1)

Polymer 2 (CE1) is obtained by the reaction of the Hofmann degradation according to example E of document WO2011015783.

Polymer 3 (CE2)

Polymer 3 (CE2) is prepared according to the same protocol as for the polymer 1 but in 2 sequences only.

The compositions of the different fractions of the polymerization process of the polymers 1 according to the invention (P1) and the comparative polymers examples (CE1 to CE2) are summarized in Table 1a.

In this Table 1a, the monomer content, described in each fraction, represents the molar weight percentage of the AMD (or DADMAC) monomer relative to the total molar weight of the corresponding monomer in the total fractions. Thus the sum of the percentages of AMD monomer, for example, in the three fractions equals 100%.

The contents of compounds I (SMS) and II (DMAM) are expressed in ppm by weight based on the total weight of monomer(s) in the three fractions.

TABLE 1a

Compositions of the polymerization process fractions to obtain the polymers P1 and comparative examples P2 to P3 (CE1 to CE2).

| | Amount of the compounds in F1 (by weight) | | Amount of the compounds in F2 (by weight) | | Amount of the compounds in F3 (by weight) | |
|---|---|---|---|---|---|---|
| P1 (INV) | AMD | 25% | AMD | 50% | AMD | 25% |
| | DADMAC | 50% | DADMAC | 50% | | |
| | DMAM | 2501 ppm | DMAM | 2501 ppm | | |
| | SMS | 2001 ppm | SMS | 950 ppm | SMS | 50 ppm |
| P2 (CE1) | DADMAC | 100% | AMD | 100% | — | |
| | PEI | 50000 ppm | MBA | 600 ppm | | |
| P3 (CE2) | AMD | 50% | AMD | 50% | — | |
| | DADMAC | 50% | DADMAC | 50% | | |
| | DMAM | 2501 ppm | DMAM | 2501 ppm | | |
| | SMS | 2051 ppm | SMS | 950 ppm | | |

The physicochemical properties of the base polymers P1 and CE1 to CE2 obtained are described in Table 1b below:

TABLE 1b

Physicochemical properties of the base polymers P1 according to the invention and comparative examples CE1 to CE2.

| | Molar ratio of the monomer(s) (mol %) | Viscosity (cps) | Molecular weight (Da) |
|---|---|---|---|
| Base polymer 1 | AMD/DADMAC 70/30 | 3 500 | 2 650 000 |
| Base polymer 2 (CE1) | AMD/DADMAC 70/30 | 4 200 | 730 000 |
| Base polymer 3 (CE2) | AMD/DADMAC 70/30 | 3 700 | 740 000 |

We observe differences and benefits provided by the invention compared to the prior art, in particular regarding the molecular weight of the base polymer, even though viscosities are of the same order of magnitude.

Table 1c hereafter presents the results of viscosity obtained for the final polymer after the Hofmann degradation reaction.

TABLE 1c

Comparison of the viscosity of the polymers of the invention P1 and comparative examples CE1 to CE3 after the Hofmann degradation.

| | Concentration of the polyvinylamine polymer obtained after Hofmann degradation reaction on the base polymer (by weight (%)) | Viscosity (cps) |
|---|---|---|
| P1 (INV) | 10 | 400 |
| P2 (CE1) | 8.5 | 85 |
| P3 (CE2) | 10 | 110 |

The method of the invention provides a polymer solution with the desired and typical viscosity required for a papermaking process while having a high molecular weight compared to a classical method of polymerization.

Application Testing

The wet pulp used in all of the application examples is obtained by disintegration of the dry pulp in order to obtain a final aqueous mass concentration of 1%. This is a pH neutral pulp with 100% recycled cardboard fibers.

Evaluation of the Drainage Under Vacuum (DDA) Performances

The DDA (Dynamic Drainage Analyzer) makes it possible to determine, automatically, the time (in seconds) necessary to vacuum dewater a fibrous suspension on a fabric. Polymers are added to the damp pulp (0.6 liters of pulp to 1.0% mass) in the cylinder of the DDA under stirring at 1000 rotations per minute:

T=0 s: stirring of the pulp
T=10 s: addition of the polymer(s)
T=30 s: halting of the stirring and vacuum drainage at 200 mBar for 60 s.

The pressure under fabric is recorded as a function of time. When the water is evacuated from the fibrous mat, air passes through it which causes a slope break on the curve representing the pressure under fabric as a function of time. The time, expressed in seconds, related to this slope break on the curve corresponds to the drainage time. The shorter the time, therefore, the better the vacuum drainage.

Performances in Dry Resistance Application, Basis Weight at 80 g·m$^{-2}$

The quantity of pulp necessary is sampled in order to ultimately obtain a sheet representing a basis weight of 80 g·m$^{-2}$.

The wet pulp is introduced into the dynamic hand sheet former tank and is kept under stirring. Different compounds are injected into this pulp, according to a pre-defined sequence. In general, there is a contact time of 30 to 45 seconds between additions of polymer.

Paper hand sheets are made with an automatic dynamic hand sheet former: a blotter and the forming fabric are placed in the tank of the dynamic hand sheet former before starting the rotation of the tank at 1000 rotations per minute and building the water wall. The treated pulp is distributed on the water wall to form the fibrous mat on the forming fabric.

Once the water is drained, the fibrous mat is recovered, pressed under a press that delivers 4 bars, then dried at 117° C. The obtained sheet is packaged for one night in a room with controlled humidity and temperature (50% relative humidity and 23° C.). The dry resistance properties of all of the sheets obtained by this procedure are then measured.

Bursting strength is measured with a Messmer Buchel M 405 burst tester according to the TAPPI T403 om-02 standard.

The length of the rupture in the dry state is measured by machine with a Testometric AX traction device according to the TAPPI T494 om-01 standard.

The quantity of the polymer added is expressed in kg of active polymer per ton of dry fiber.

Trials at 1 kg/t and 1.5 kg/t were conducted and are summarized in table 2. The results are expressed as a percentage of increase compared to a blank (no polymer).

TABLE 2

Drainage and dry strength results of the polymers 1 according to the invention (INV) and comparative examples polymers 2 to 3 (CE1 to CE2)

| | Percentage of increase Burst (%) | Percentage of increase DBL (%) | Percentage of increase DDA (%) |
|---|---|---|---|
| Blank | 0 | 0 | 0 |
| P1 (INV) (1 kg/t) | 20.2 | 23.1 | 34.5 |
| P2 (CE1) (1 kg/t) | 15.5 | 18.8 | 18.2 |
| P3 (CE2) (1 kg/t) | 15.7 | 18.8 | 18.2 |
| P1 (INV) (1.5 kg/t) | 27.5 | 28.4 | 56.4 |
| P2 (CE1) (1.5 kg/t) | 23.2 | 22.9 | 44.7 |
| P3 (CE2) (1.5 kg/t) | 23.2 | 22.5 | 45.1 |

It is interesting to note that the polymers of the invention present drainage performances (DDA) and mechanical characteristics (Burst; DBL; rupture in the dry state) that are improved based on the most efficient product on the market.

The invention claimed is:

1. A polyvinylamine polymer resulting from the Hofmann Degradation reaction of a base polymer comprising:
   at least one cationic monomer A;
   at least one non-ionic monomer B selected from acrylamide, acrylonitrile, methacrylamide and mixtures thereof;
   at least one structuring system comprising:
   (i) at least one compound I, selected from: allylsulfonic acid, methallylsulfonic acid, allyldisulfonic acid, methallyldisulfonic acid, salts and mixtures thereof;

(ii) at least one compound II of formula (1):

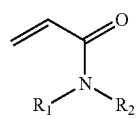

Formula (1)

$R_1$ and $R_2$ being, independently of each other, a hydrogen atom, a methyl group, an ethyl group, an isopropyl group or a $CH_2$—OH group;

$R_1$ and $R_2$ not both being a hydrogen atom;

said polymer lacking an anionic monomer other than compound I;

said polyvinylamine polymer being obtained according to the following steps:
a) formation of a solution (S1) comprising at least a first fraction (F1) containing (1) at least one monomer selected from monomers A and B and (2) at least one compound selected from compounds I and II;
b) polymerization 1 (PO1) of the fraction F1 to form a solution of a solution of a first gradient polymer (PG1);
c) addition, to the solution comprising PG1, of a second fraction (F2) containing (1) at least one monomer selected from monomers A and B and (2) at least one compound selected from compounds I and II;
d) polymerization 2 (PO2) of the fraction F2 on PG1 in order to form a solution of a second gradient polymer (PG2);
e) addition, to the solution comprising PG2 of a third fraction (F3) containing (1) at least one monomer selected from monomers A and B and (2) at least one compound selected from compounds I and II;
f) polymerization 3 (PO3) of fraction F3 on PG2 in order to form a solution comprising a base polymer;
g) dilution of the solution comprising this base polymer and Hofmann degradation reaction on the base polymer in order to obtain a polyvinylamine polymer and at least one of the fractions F1, F2 or F3 contains at least one monomer A, at least one of the fractions F1, F2 or F3 contains at least one monomer B, at least one of the fractions F1, F2 or F3 contains at least one compound I and at least one of the fractions F1, F2 or F3 contains at least one compound II.

2. The polyvinylamine polymer according to claim 1, wherein the at least one cationic monomer A is selected from dimethyldiallyl ammonium chloride, acrylamide propyltrimethyl ammonium chloride, methacrylamide propyltrimethyl ammonium chloride and mixtures thereof.

3. The polyvinylamine polymer according to claim 1, wherein the base polymer comprises between 500 and 50,000 ppm of compound I, based on the total weight of monomers A and B.

4. The polyvinylamine polymer according to claim 1, wherein the base polymer comprises between 500 and 50,000 ppm of compound II, based on the total weight of monomers A and B.

5. The polyvinylamine polymer according to claim 1, wherein compound II is selected from: N,N-dimethylacrylamide, N,N-diethylacrylamide, N,N-isopropylacrylamide, N-methylolacrylamide and mixtures thereof.

6. The polyvinylamine polymer according to claim 1, wherein the mass ratio between compound I and compound II is comprised between 0.01 and 100.

7. The polyvinylamine polymer according to claim 1, wherein at least one of fraction F1, F2 or F3 is different from the other fractions.

8. A method of sequential preparation of a polyvinylamine polymer, comprising the following steps:
a) formation of a solution (S1) comprising at least a first fraction (F1) containing (1) at least one monomer selected from monomers A and B and (2) at least one compound selected from compounds I and II;
the at least one monomer A being a cationic monomer;
the at least one monomer B being a non-ionic monomer selected from acrylamide, acrylonitrile, methacrylamide and mixtures thereof;
the at least one compound I being selected from allylsulfonic acid, methallylsulfonic acid, allyl disulfonic acid, methallyl disulfonic acid, salts and mixtures thereof;
the at least one compound II being of formula (1):

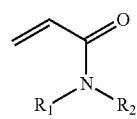

Formula (1)

$R_1$ and $R_2$ being, independently of each other, a hydrogen atom, a methyl group, an ethyl group, an isopropyl group or a $CH_2$—OH group;

$R_1$ and $R_2$ not both being a hydrogen atom;

said polymer is free of anionic monomer other than compound I;
b) polymerization 1 (PO1) of a fraction F1 to form a solution of a first gradient polymer (PG1);
c) addition, to the solution comprising PG1, of a second fraction (F2) containing (1) at least one monomer selected from monomers A and B and (2) at least one compound selected from compounds I and II;
d) polymerization 2 (PO2) of the fraction F2 on PG1 in order to form a solution of a second gradient polymer (PG2);
e) addition, to the solution comprising PG2 of a third fraction (F3) containing (1) at least one monomer selected from monomers A and B and (2) at least one compound selected from compounds I and II;
f) polymerization 3 (PO3) of the fraction F3 on PG2, in order to form a solution comprising a base polymer;
g) dilution of the solution comprising the base polymer and Hofmann degradation reaction on the base polymer in order to obtain the polyvinylamine polymer.

9. The method according to claim 8, wherein at least one of fraction F1, F2 or F3 is different from the other fractions.

10. The method according to claim 8, wherein an initiator is added continuously throughout the polymerization process.

11. The method according to claim 8, wherein, after step f) of polymerization (PO3), and prior to step g), the method comprises a step of aging from 10 minutes to 100 minutes.

12. The method according to claim 8,
wherein the Hofmann degradation reaction comprises at least the following steps:
g1) dilution of the solution comprising the base polymer in order to obtain a diluted solution of the base polymer (SD1);

g2) addition of an alkaline or alkaline earth metal hypohalite and of an alkaline or alkaline earth metal hydroxide in order to obtain a diluted solution (SD2);

g3) reaction between the base polymer, the alkaline metal or alkaline earth hypohalite and the alkaline metal or alkaline earth metal hydroxide;

g4) obtaining a solution comprising a polyvinylamine polymer (SD3).

13. A paper or cardboard manufacturing method comprising adding a polyvinylamine polymer according to claim 1 to an aqueous suspension of fibers and forming a sheet of paper or cardboard.

14. A method for the recovery of hydrocarbons; in the drilling or cementing of wells; in the stimulation of hydrocarbon wells; in the treatment of water in open, closed or semi-closed circuit; in the treatment of fermentation musts; in the treatment of sludges; in construction; in lumber processing; in the treatment of hydraulic composition; in the mining industry; in the formulation of cosmetic products; in the formulation of detergents; in textile manufacturing; in the geothermal sector; in the manufacture of sanitary napkins; or in agriculture; said method comprising adding the polyvinylamine polymer according to claim 1 to an aqueous solution, and using the resultant solution in the method.

15. A composition comprising the polyvinylamine polymer according to claim 1, wherein said composition is a flocculant, coagulant, binding agent, fixing agent, viscosity-reducing agent, thickening agent, absorption agent, friction-reducing agent, drainage agent, charge-retaining agent, dehydrating agent, conditioning agent, stabilizing agent, fixing agent, film-forming agent, sizing gent, superplasticizer agent, clay inhibitor or dispersant.

16. The polyvinylamine polymer according to claim 2, wherein the base polymer comprises between 500 and 50,000 ppm of compound I, based on the total weight of monomers A and B.

17. The polyvinylamine polymer according to claim 16, wherein the base polymer comprises between 500 and 50,000 ppm of compound II, based on the total weight of monomers A and B.

18. The polyvinylamine polymer according to claim 17, wherein compound II is selected from: N,N-dimethylacrylamide, N,N-diethylacrylamide, N,N-isopropylacrylamide, N-methylolacrylamide and mixtures thereof.

19. The polyvinylamine polymer according to claim 18, wherein the mass ratio between compound I and compound II is comprised between 0.01 and 100.

20. The polyvinylamine polymer according to claim 19, wherein at least one of fraction F1, F2 or F3 is different from the other fractions.

* * * * *